United States Patent [19]

Rappaport

[11] 4,261,125
[45] Apr. 14, 1981

[54] TRANSPARENCY BLOCK

[75] Inventor: Sherman L. Rappaport, Aurora, Ohio

[73] Assignee: Rappaport Exhibits, Inc., Cleveland, Ohio

[21] Appl. No.: 72,137

[22] Filed: Sep. 4, 1979

[51] Int. Cl.$^3$ ............................................. G02B 27/02
[52] U.S. Cl. .................................. 40/367; 40/152.2; 40/564; 40/10 D
[58] Field of Search ...................... 40/152.2, 156, 564, 40/10 D, 10 R, 152, 152.1, 367, 10

[56] References Cited

U.S. PATENT DOCUMENTS

| | | | |
|---|---|---|---|
| 2,521,558 | 9/1950 | Alvarez | 40/10 R X |
| 3,771,244 | 11/1973 | Ebner | 40/152 |
| 3,877,162 | 4/1975 | Wilson | 40/10 D |

FOREIGN PATENT DOCUMENTS

| | | | |
|---|---|---|---|
| 1250556 | 12/1960 | France | 40/564 |
| 1345707 | 12/1963 | France | 40/564 |

*Primary Examiner*—Gene Mancene
*Assistant Examiner*—Wenceslao J. Contreras
*Attorney, Agent, or Firm*—Isler and Ornstein

[57] ABSTRACT

A transparency block is disclosed which is attractive in appearance and provides a maximum of image area for any given dimension of block. An important feature of the invention is the use of locking fingers of unique construction for holding transparencies firmly in the block, and without the need for tape or mechanical mounting. Another feature is the provision of a built-in circline fluorescent lamp for providing maximum illumination of the transparency at a minimum of energy expenditure or cost. The block may be hung horizontally or vertically, and is so designed that it may be used in isolated manner or grouped with other or similar blocks, as may be required. For this purpose, it has a built-in recessed outlet for uncluttered interconnection with other similar blocks.

8 Claims, 9 Drawing Figures

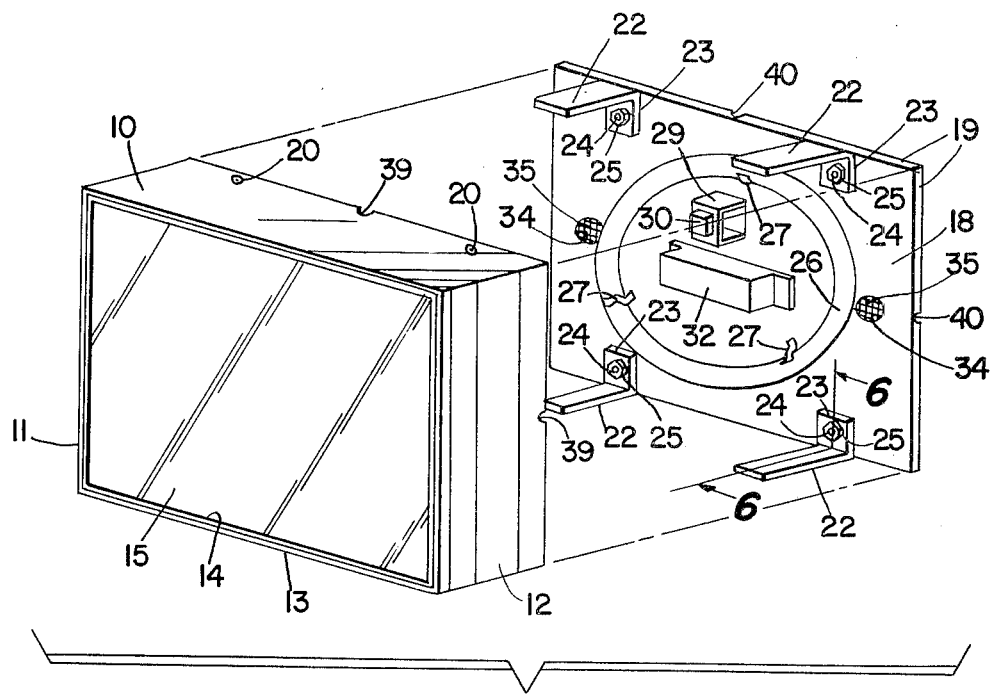
Fig. 1
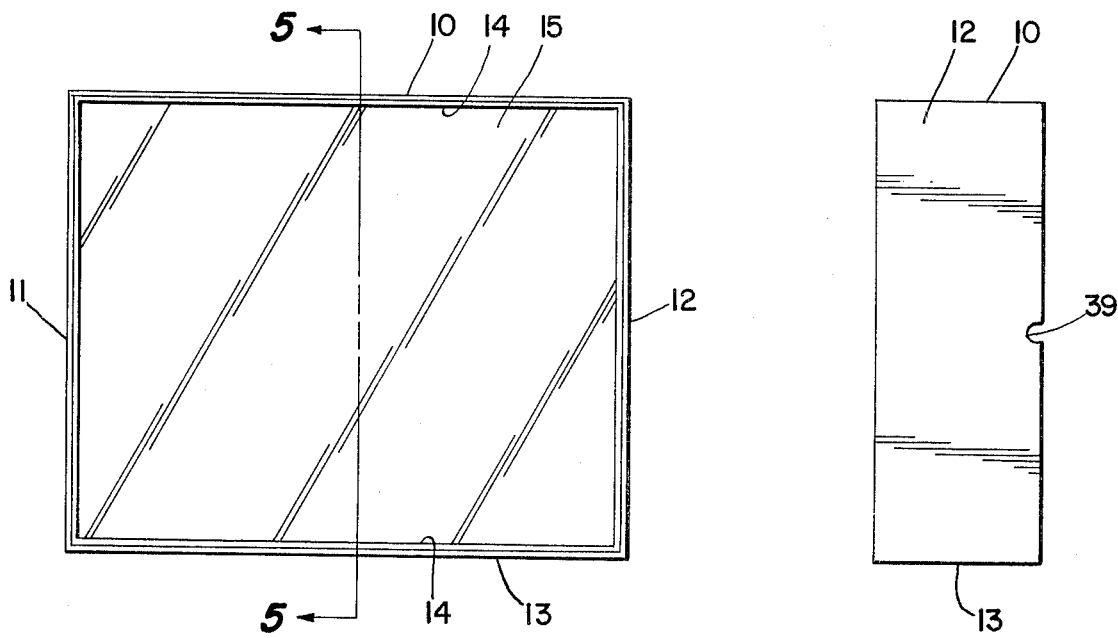
Fig. 2
Fig. 3

TRANSPARENCY BLOCK

This invention relates, as indicated, to transparency blocks, but has reference more particularly to an illuminated box or block, for viewing transparencies, which may be defined as something that is transparent especially a picture or other matter for exhibition, made upon glass, thin cloth, paper or film, and intended to be viewed by the aid of light shining through it or by projection.

A primary object of the invention is to provide a transparency block of the character described, which is attractive in appearance and provides a maximum of image area for any given dimensions of block.

Another object of the invention is to provide a transparency block of the character described having ultra-thin framing edges which lend to its attractive appearance.

A futher object of the invention is to provide a transparency block of the character described, which may be mounted vertically or horizontally.

A further object of the invention is to provide a transparency block of the character described, having locking fingers of unique construction for holding transparencies firmly and without the aid of tape or mechanical mounting.

A further object of the invention is to provide a transparency block of the character described having a built-in circline fluorescent lamp for providing maximum illumination of the transparency at a minimum of energy expenditure or cost.

A further object of the invention is to provide a transparency block of the character described, which is so designed that the block may be used in isolated manner or grouped with other or similar blocks, as may be required.

A still further object is to provide a transparency block of the character described having a built-in recessed outlet for uncluttered interconnection with other similar blocks.

Other objects and advantages of the invention will appear or become apparent in the course of the following description, taken in conjunction with the drawings and wherein like reference characters and numerals are used throughout to designate like arts.

FIG. 1 is an exploded view of the parts constituting the transparency block;

FIG. 2 is a front elevational view of the transparency block;

FIG. 3 is a side or end elevational view of the transparency block;

Referring more particularly to the drawings, the transparency block will be seen to comprise a rectangular frame molded or formed from a white plastic to provide a top 10, sides 11 and 12, and a bottom 13.

Figure 5:
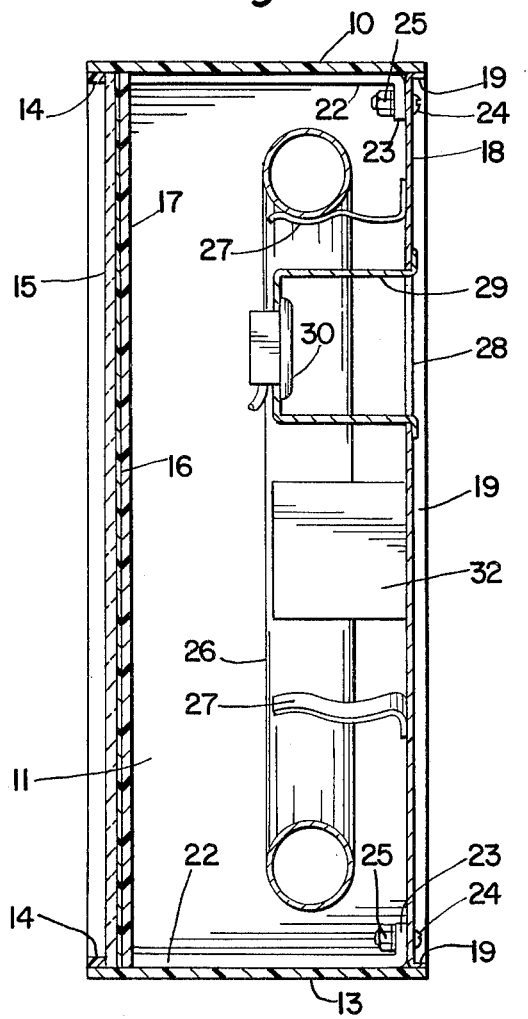
FIG. 5 is a cross-sectional view, on somewhat enlarged scale, taken on the line 5—5 of FIG. 2.
Figure 6:
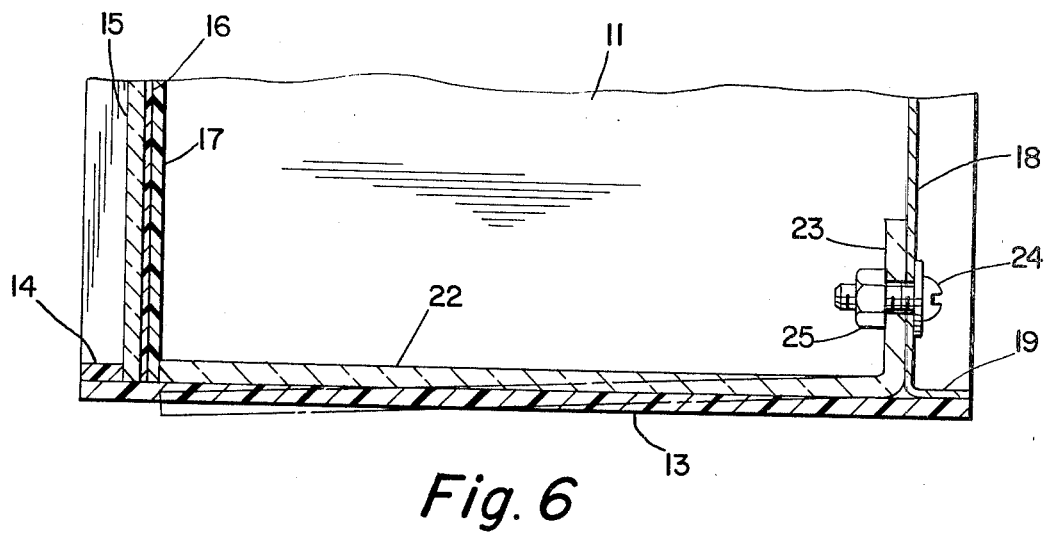
FIG. 6 is a fragmentary cross-sectional view, taken on the line 6—6 of FIG. 1.

Secured within this frame, adjacent the front edges of the top 10, sides 11 and 12, and bottom 13, is a rectangular plastic accent strip 14 which is preferably of a black color for contrast with the frame, the strip being cemented or adhesively secured to the inner surfaces of the rectangular frame, as best seen in FIGS. 5 and 6.

Disposed within the aforesaid rectangular frame, in abutment with the accent strip 14, is a rectangular panel 15, made of a clear or transparent acrylic resin and providing a flat surface for the transparency 16, which is to be viewed. The panel 15 may be cemented or otherwise adhesively secured to the rear edges of the accent strip 14.

Secured loosely within th rectangular frame 10-11-12-13 is a second rectangular panel 17, of approximately the same dimensions as the panel 15, but made of a milk-white translucent acrylic resin and providing a backing or rigid support for the transparency 16.

The transparency block further includes a rectangular rear closure or panel 18, made of sheet metal and provided at its periphery with a rearwardly extending flange 19.

Figure 4:
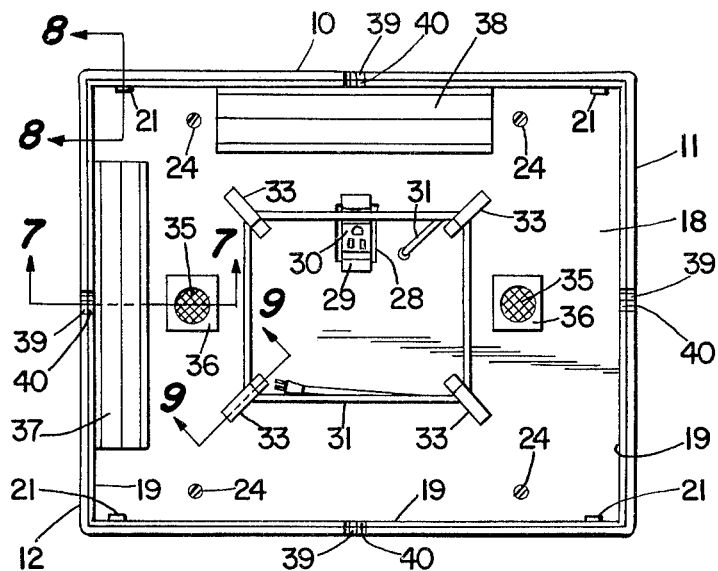
FIG. 4 is a rear elevational view of the transparency block.
Figure 8:
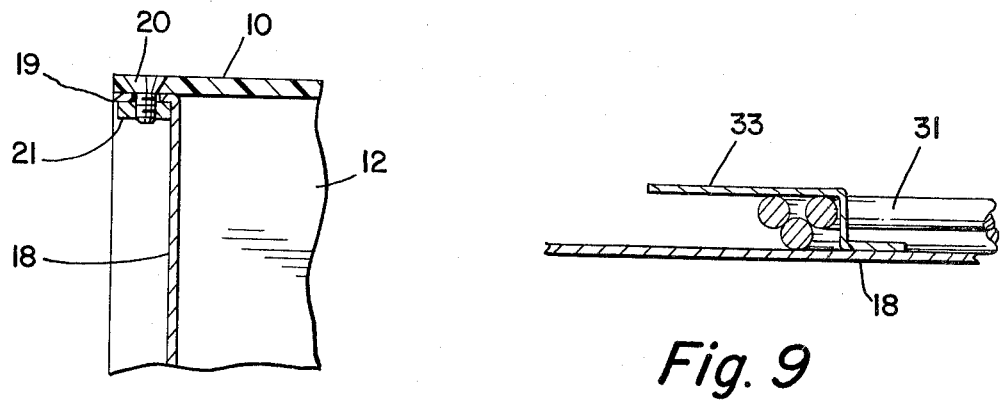
FIG. 8 is a fragmentary cross-sectional view, taken on the line 8—8 of FIG. 4.

The closure or panel 18 is secured to the frame 10-11-12-13 by means of screws 20, which extend through the flange 19, and nuts 21, which are secured to the screws 20, as best seen in FIGS. 4 and 8.

For the purpose of removably securing the closure or panel 18 to the frame 10-11-12-13, the closure or panel 18 is provided adjacent its upper and lower edges with locking fingers, which are best seen in FIGS. 1, 4, 5 and 6.

Each locking finger is molded or formed from a length of clear acrylic resin to provide a finger proper 22 and a flange 23 which extends parallel to the closure or panel 18, and is removably secured to the panel 18 by means of a screw 24 and a nut 25.

It will be noted in FIG. 6 that the length of the locking fingers 22 is such that when the closure or panel 18 has been inserted into the frame 10-11-12-13 in the position shown in FIG. 6, the forward ends of the locking fingers are in engagement or abutment with marginal portions of the panel 17, so that these fingers hold the panel 17 and thus the transparency 16 in position, without the aid of tape or other mechanical means for mounting or supporting the transparency in the block.

It will be further noted in FIG. 6, that the locking fingers 22, before insertion into the frame 10-11-12-13 occupy the position indicated by the broken lines. When the fingers are being inserted into the frame, they are bent or biased to the position shown in solid lines in FIG. 6, and thus slide on the inner surfaces of the top 10 and bottom 13 of the frame, so that when they are in said solid line position, they resiliently engage said surfaces and thus in effect lock the closure or panel 18 to the transparency block.

The transparency block further includes a 32-watt circline fluorescent lamp 26 which as best seen in FIGS. 1 and 5, is mounted on circumferentially-spaced spring clips 27, which are spot-welded or otherwise secured to the closure or panel 18. The lamp 26 provides maximum illumination of the transparency 16 at a minimum of energy expenditure or cost.

The closure 18 has a rectangular opening 28 therein in which a U-shaped bracket 29 is mounted and extends inwardly into the frame 10-11-12-13.

The bracket 29 has mounted therein an electrical outlet 30, to which electrical current is supplied to the lamp 26 by a six foot lead or cable 31, through a ballast 32, which is mounted on the closure 18.

Figure 9:
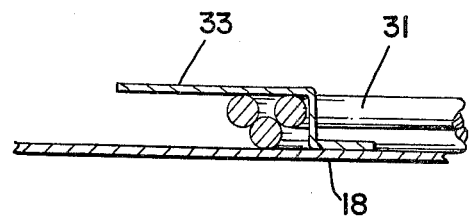
FIG. 9 is a fragmentary cross-sectional view, taken on the line 9—9 of FIG. 4.

As best seen in FIGS. 4 and 9, the lead or cable 31 is wound about brackets 33, which are spot-welded or otherwise secured to the outer face of the closure or panel 18.

Figure 7:
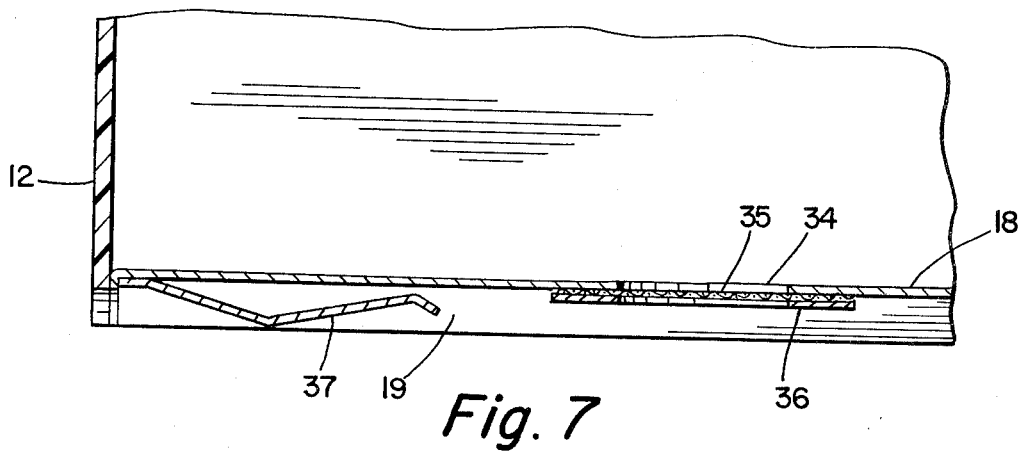
FIG. 7 is a fragmentary cross-sectional view, taken on the line 7—7 of FIG. 4.

As best seen in FIGS. 4 and 7, ventilating openings 34 are provided in the closure or panel 18 for the purpose of permitting escape of heat from the interior of the block, these openings being covered with screening 35 which is secured to closure 18 by frames 36.

As seen in FIGS. 4 and 7, a Z-bar hanger bracket 38 is secured to the rear of the closure 18 for the purpose of hanging the transparency block horizontally, and a similar Z-bar hanger bracket 37 is secured to the rear of the closure 18, for the purpose of hanging the transparency block vertically.

For the purpose of permitting groups of blocks to be interconnected for simultaneous viewing, without exposing the electrical leads or cables and without cluttering of the areas about the blocks, with such leads or cables, the frame parts 10, 11, 12 and 13 are provided adjacent their rear edges with recesses or openings 39, and the flange 19 of the closure 18 is provided with mating recesses or openings 40, for the passage therethrough of the leads or cables which interconnect the blocks.

In using the transparency block, the closure 18 and the panel 17 are removed from the frame 10-11-12-13 and the transparency 16, which is to be viewed, is placed against the panel 15, after which the panel 17 is placed in the frame and moved to the position shown in FIGS. 5 and 6, to thereby hold the transparency flat against the panel 15.

The closure 18 is then replaced in the frame.

In the course of thus replacing the closure 18, the locking fingers 22 are inserted into the frame in the manner which has been described above, so that when they are in their final position, as shown in FIGS. 5 and 6, they resiliently engage the inner surfaces of the top 10 and bottom 13 of the frame, and thus in effect, lock the closure panel 18 to the transparency block, and at the same time, lock the panel 17 in operative position.

The transparency block may then be lighted for viewing purposes by lighting the lamp 26.

It is thus seen that I have provided a transparency block which fulfills all of the stated objects of the invention.

It is to be understood that the form of my invention herewith shown and described is to be taken as a prepared example of the same, and that various changes may be made in the shape, size and arrangement of parts thereof, without departing from the spirit of the invention or the scope of the subjoined claims.

Having thus described my invention, I claim:

1. In a transparency block of the character described, a rectangular frame, a transparent panel disposed adjacent the front of said frame, a movable translucent panel adapted for movement toward said transparent panel for holding a transparency flat against said transparent panel, a rectangular panel for closing the rear of said frame, said rectangular panel adapted to be removably secured to said frame, and resilient locking fingers secured to said rectangular panel and of a length such that when said rectangular panel is in operative position, said fingers engage said translucent panel and lock the latter in transparency holding position.

2. A transparency block, as defined in claim 1, wherein said locking fingers are resiliently biased into frictional engagement with inner surfaces of said frame.

3. A transparency block, as defined in claim 2, including a circular fluorescent lamp mounted on said closure panel.

4. A transparency block, as defined in claim 3, including a bracket mounted on said closure panel, and an electrical outlet supported by said bracket.

5. A transparency block, as defined in claim 4, including a cable for supplying electrical current to said outlet, and means on said closure panel for supporting said cable in a coiled or wound condition.

6. A transparency block, as defined in claim 5, including means on said closure panel for venting heat from the interior of the block.

7. A transparency block, as defined in claim 6, including means for hanging said block horizontally or vertically.

8. A transparency block, as defined in claim 7, wherein said closure panel is provided with a rearwardly extending peripheral flange, and means are provided for removably securing said flange to the top and bottom of said frame.

* * * * *